R. C. GALLETTI.
WIRELESS TELEGRAPHY.
APPLICATION FILED DEC. 20, 1907.
960,304.
Patented June 7, 1910.
3 SHEETS—SHEET 1.
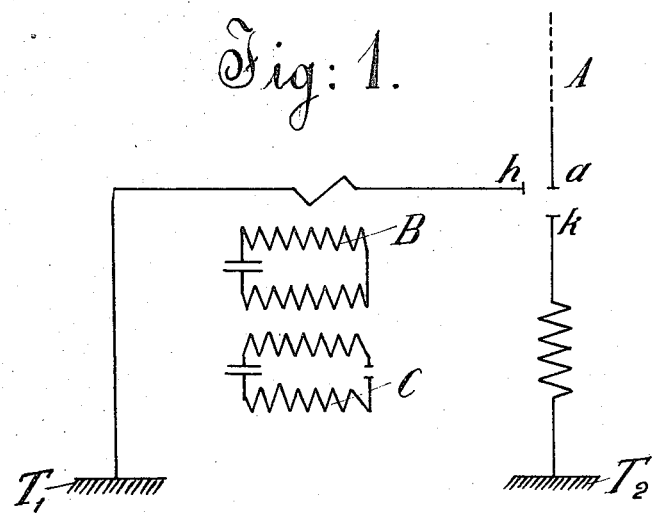
Fig: 1.
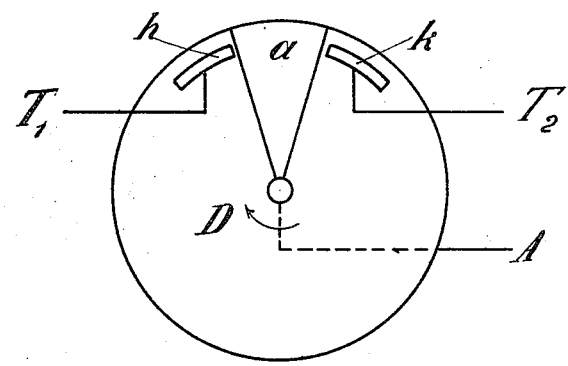
Fig: 2.
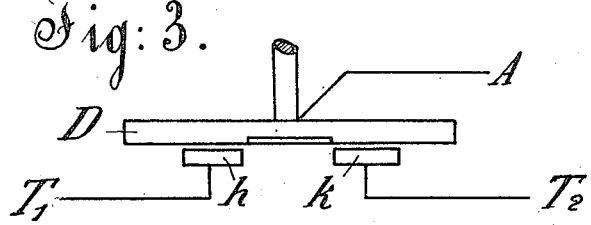
Fig: 3.
Witnesses
Inventor:
Roberto C. Galletti,
By Wm. E. Boulter
Attorney

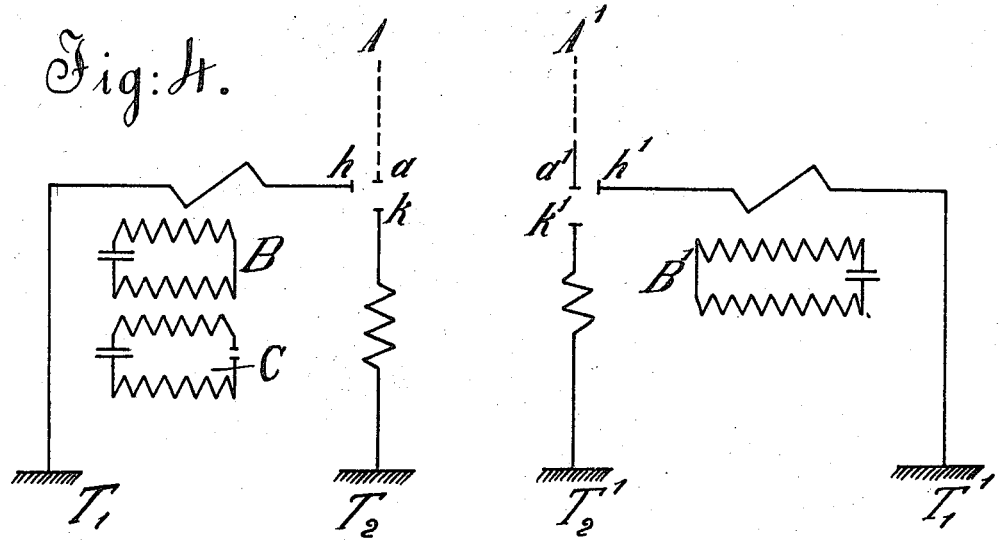
Fig: 4.
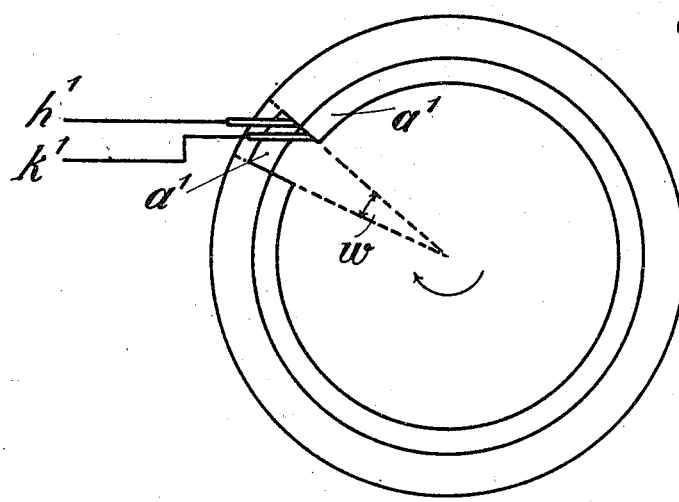
Fig: 5.

R. C. GALLETTI.
WIRELESS TELEGRAPHY.
APPLICATION FILED DEC. 20, 1907.
960,304.
Patented June 7, 1910.
3 SHEETS—SHEET 3.
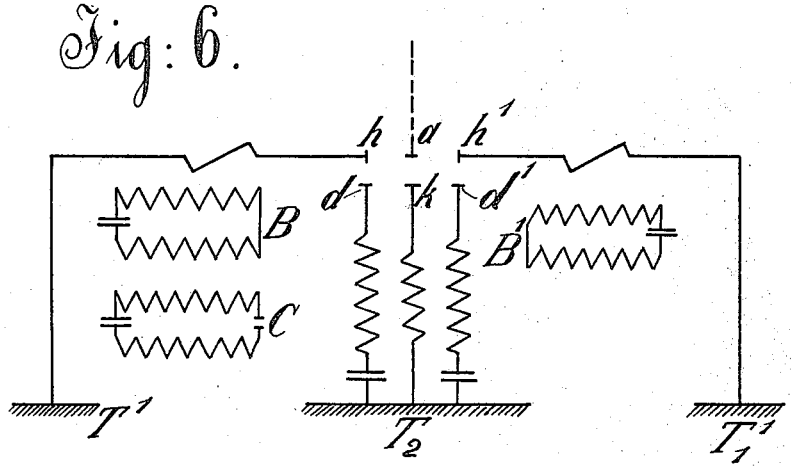
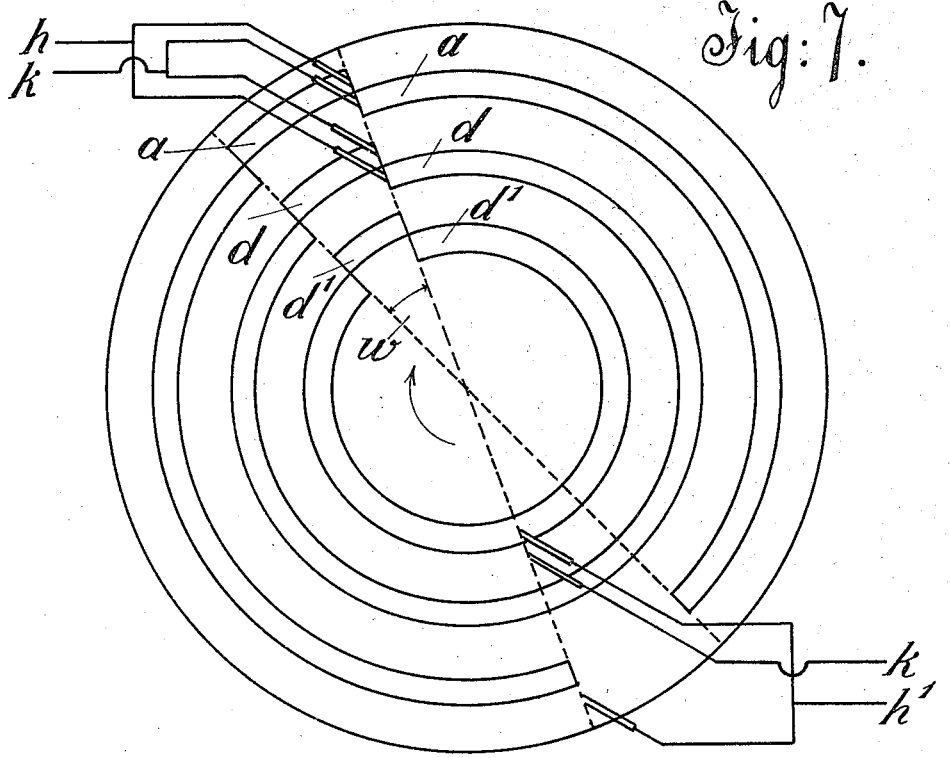

ROBERTO C. GALLETTI, OF ROME, ITALY

WIRELESS TELEGRAPHY.

960,304.

Specification of Letters Patent.  Patented June 7, 1910.

Application filed December 20, 1907. Serial No. 407,298.

*To all whom it may concern:*

Be it known that I, ROBERTO C. GALLETTI, a subject of the King of Italy, residing at Rome, in Italy, have invented certain new and useful Improvements in Wireless Telegraphy, of which the following is a specification.

This invention relates to wireless telegraphy and has for its object to provide a novel arrangement of apparatus whereby the energy transmitted is more effectively utilized.

A feature of the invention is that a source of continuous oscillations is employed, produced for example by Poulsen's method, but the oscillations are only transmitted in periodic groups each containing only that number of oscillations which is necessary to attain the "steady" state for the particular transmitting aerial, and its corresponding receiving aerial, so as to obtain the maximum effect in the receiving apparatus. This result is obtained according to the present invention by employing a circuit for accumulating oscillations in between the source of continuous oscillations and the aerial, a contact device or commutator making periodic connection to the aerial. In telegraphy by Morse signs, about 20 groups of oscillations per second are sufficient. If a given wireless telegraph system comprising transmitting and receiving aerials need the fraction of a second $t$ to reach the steady state, then the circuit accumulating the oscillations may furnish to the aerial in each second 20 groups of oscillations of the total duration 20 $t$, while it absorbs energy from the source of continuous oscillation uninterruptedly during the whole second. The power of transmission is increased in the ratio $\frac{1}{20} t$ and the maximum syntonic effects inherent with the steady state, *i. e.*, the state when the current in the receiving circuit reaches its maximum value, are attained. With a periodical emission of electric oscillations from the transmitting station for each group of duration $t$ with intervals or lapses of $t'$, it is evident that the connection between the receiving aerial and the system of receiving circuits is only of advantage during the time $t$ in which the oscillations arrive, while during the intervals $t'$ the connection to the aerial is a disadvantage in that the aerial during this time rapidly dissipates the energy already communicated by it to the other circuits which generally in practice have a small damping coefficient.

A further feature of the invention is that a commutator or contact-making device is therefore employed in connection with the receiving aerial as well as with the transmitting aerial, the receiving contact device operating synchronously with the periodical transmission, so avoiding the disadvantages of having the receiving aerial in permanent connection with the receiving circuits as just explained.

Another feature of this invention is an arrangement of contacts in a commutator of the type just referred to so that one aerial may act as transmitting and receiving station at the same time, thereby providing for a duplex system of telegraphy.

Other features of this invention will be evident from the following description taken in connection with the accompanying drawings, in which—

Figure 1 is a diagram of the circuits employed; Fig. 2 is an elevation of the contact-making device; Fig. 3 is a plan of the same; Fig. 4 shows diagrammatically the circuits employed at the transmitting and receiving stations; Fig. 5 shows diagrammatically one form of commutator adapted to be used with the arrangement of circuits shown in Fig. 4; Fig. 6 shows diagrammatically the circuits employed at one station for duplex telegraphy; and Fig. 7 shows diagrammatically one form of commutator device adapted to be employed with the circuits shown in Fig. 6.

Referring to Figs. 1, 2 and 3, A represents the aerial, B is a circuit for accumulating oscillations, consisting of a condenser of considerable capacity relatively to the wavelength employed and of so much inductance in the spirals of thick wire between the terminals of the condenser as is necessary for inductive connection with the source C of the continuous oscillations and with the aerial A; and for obtaining an oscillation of a period identical or in harmonic relation with the period of oscillation in A and in C. The circuit B is of very small resistance as it is preferably closed without a spark, though a short spark might be employed. The circuit B is immersed in insulating oil to avoid losses by brush discharge, etc., caused by the high potential employed. The circuit B cannot emit oscillations except by means of the aerial because no straight wires are employed in its formation and said circuit is not a good radiator because it is closed and because the persistence of the same is high. The wire which leads from the aerial A to the earth $T_1$ has a loose inductive coupling with the circuit B. The contact-making device for making connection with the aerial during the instant $t$ desired with intervals of $$\frac{1-20t}{20}$$

may be a disk of insulating material D, Figs. 2 and 3, provided with a segment of platinum $a$ and kept in motion by a motor. A fixed contact $h$ is provided, also of platinum, leaving such a small air-space as can be broken down by the small spark which can be produced by the potential continually developed in the length of wire $T_1 h$. The advantage of leaving the air-space between the contacts is that friction is eliminated and no metallic powder is produced which might be transported on to the insulating portion D or float in the air. To avoid the long spark which otherwise would take place on breaking the connection with the aerial, and also to avoid the energy accumulating in the aerial from being lost in waves of various lengths, a second contact $k$ is provided which leads to the earth $T_2$ through a wire which forms with the aerial an oscillating system of the same period as $AhT_1$, when the disk in its rotation joins $k$ to $a$ before disconnecting $a$ from $h$. $k$ may be kept constantly joined to $a$. It has been hereinbefore stated that the length of time $t$ of each group of oscillations is preferably made equal to that time which the transmitting and receiving aerials, or more precisely the system of the aerials together with the circuits joined to them, need to obtain the steady state. If the time interval $t'$ be so established that during the time $t+t'$ the accumulating circuit of the transmitting station may not have attained its own steady state without the aerial and may have usefully accumulated energy and that the circuit $B^1$ of the receiving station may have usefully stored part of the energy given to it by its aerial, then it is evident that the maximum efficiency both of transmission and of reception is really to be obtained by using commutating or contact-making devices making periodical connection to the aerials in such fashion that these enter into action for a certain time not greater than $t$ and are detached for a certain interval not greater than $t'$. When continuous oscillations are employed, the power of transmission is increased more or less proportionately to the ratio $$\frac{t+t'}{t}.$$

If $t$ and $t'$ be determined experimentally for two stations so as to obtain the greatest strength of signals then $f$ the most useful frequency of commutation is also determined being given by the formula $$f=\frac{1}{t+t'}.$$

In telegraphy by Morse signs it is sufficient if the number $f$ be greater than 20.

In Fig. 4 A is the transmitting aerial. C is the source of continuous oscillations and B the circuit for accumulating the oscillations, a contact-making device being employed to join $a$ to $h$ and $a$ to $k$ as hereinbefore fully explained. At the receiving station $A^1$ is the aerial, $B^1$ the receiving resonant circuit, $h^1$ is a contact to the receiving wire connected to earth at $T_1^1$. $a^1$ is a contact on the aerial, $k^1$ is a contact to a circuit connected to earth at $T_2^1$ forming with the aerial an oscillating system of the same period as $A^1 h^1 T_1^1$.

The contact-making device or commutator shown in Fig. 5 consists of a disk of insulating material which is rotated at the rate of $f$ turns per second. On the disk are portions of metallic rings $a^1 a^1$ connected as previously mentioned to the aerial $A^1$. Brushes bear on these rings $a^1 a^1$, these brushes forming the contacts $h^1 k^1$. The angle $w$ is equal to $2\pi ft$. It will be evident therefore that the aerial is connected to the contact $h^1$ during an interval $t$ as required, and during an interval $t'$ with the contact $k^1$. The wire between $k^1$ and $T_2^1$ forms with the aerial a resonant system of the same length of wave adopted for use between the two stations and prevents the aerial on making and breaking connection with $h^1$ from developing sparks as would happen in certain electric conditions of the atmosphere.

Referring to Figs. 6 and 7, for duplex telegraphy the transmission and receiving circuits are connected to a single commutator (Fig. 7), in such a manner that at every turn of the commutator or contact-making device the aerial is successively in contact with $h$ for the time $t$, with $k$, for the time $$\frac{t'-t}{2},$$

and with $h^1$ for the time $t$, with $k$ for the time $$\frac{t'-t}{2}.$$

The synchronous commutator in the corresponding station precedes or is retarded by an angle $\pi$. When for particular reasons it is impossible to so arrange matters that the initial period of oscillation of the circuit B¹, the aerial being removed, be equal to or in harmonic relation with the period of the oscillations which are developed when the aerial enters into action, one must employ additional circuits connected to $d$ $d^1$, as shown in Fig. 6. The circuits connected to $d$ and $d^1$ which are shown in Fig. 6 already referred to may consist of wire wound in spirals joined to earth through a condenser. They have the same time-constant of oscillation as the aerial but have a minimum damping coefficient. The portions of metallic rings $d$ and $d^1$ on the commutator shown in Fig. 7 are for the connections to $d$ and $d^1$ shown in Fig. 6. While $a$ is in connection with $h$, $d$ is in connection with $k$ and vice versa, and while $a$ is in connection with $h^1$, $d^1$ is in connection with $k$ and vice versa. When $a$ is in contact with $h^1$, $d$ continues in contact with $h$, and when $a$ is in contact with $h$, $d^1$ continues with $h^1$.

What I claim as my invention and desire to secure by Letters Patent is—

A system of wireless telegraphy in which a closed oscillating circuit is used to accumulate energy which is emitted periodically by an antenna, the duration of the emission of the energy by the antenna being continued until the emission reaches the steady condition.

In testimony whereof I have signed my name to this specification in the presence of two subscribing witnesses.

R. C. GALLETTI.

Witnesses:
GHERRA CARTANN,
H. D. JAMESON.